United States Patent
Dong et al.

(10) Patent No.: US 10,495,525 B2
(45) Date of Patent: Dec. 3, 2019

(54) SAPPHIRE SENSOR APPARATUS INCLUDING AN OPTICAL FIBER FOR MEASURING PRESSURE AND TEMPERATURE

(71) Applicant: Sentek Instrument, LLC, Blacksburg, VA (US)

(72) Inventors: Bo Dong, Blacksburg, VA (US); Anbo Wang, Blacksburg, VA (US)

(73) Assignee: SENTEK INSTRUMENT LLC, Blacksburg, VA (US)

( * ) Notice: Subject to any disclaimer, the term of this patent is extended or adjusted under 35 U.S.C. 154(b) by 123 days.

(21) Appl. No.: 15/705,737

(22) Filed: Sep. 15, 2017

(65) Prior Publication Data

US 2018/0058949 A1 Mar. 1, 2018

Related U.S. Application Data

(62) Division of application No. 14/261,883, filed on Apr. 25, 2014, now Pat. No. 9,804,033.

(60) Provisional application No. 61/816,146, filed on Apr. 25, 2013.

(51) Int. Cl.

| | | |
|---|---|---|
| *G01D 21/02* | (2006.01) | |
| *G01K 11/32* | (2006.01) | |
| *G01L 9/00* | (2006.01) | |
| *G01L 19/00* | (2006.01) | |
| *G01D 5/26* | (2006.01) | |

(52) U.S. Cl.
CPC ......... *G01K 11/3206* (2013.01); *G01D 5/266* (2013.01); *G01D 5/268* (2013.01); *G01L 9/0079* (2013.01); *G01L 19/0092* (2013.01)

(58) Field of Classification Search
CPC .... G01K 11/3206; G01D 5/266; G01D 5/268; G01L 9/0079; G01L 9/0092; G01B 9/02; G01J 5/00
See application file for complete search history.

(56) References Cited

U.S. PATENT DOCUMENTS

| | | | |
|---|---|---|---|
| 7,903,907 B1 * | 3/2011 | Park | G01D 3/0365 250/227.11 |
| 8,559,770 B2 * | 11/2013 | Donlagic | G02B 6/00 385/12 |

(Continued)

*Primary Examiner* — Harshad R Patel
*Assistant Examiner* — Nigel H Plumb
(74) *Attorney, Agent, or Firm* — W & C IP

(57) ABSTRACT

A sensor apparatus and system for measuring pressure, temperature or both with a single interrogator includes a sensor having a cavity, a diaphragm and an optical element or base for conducting energy to and from the cavity and diaphragm. The two surfaces of the diaphragm and a surface of optical element and either surface of the diaphragm are partially reflecting surfaces and respectively define two optical path distances (OPDs) that produce preferential reflections and interference patterns at different optical frequencies or wavelengths that are respectively affected by pressure or temperature. Arranging the OPDs such that the fundamental frequency and harmonics of preferential reflections one OPD do not coincide with the fundamental frequency or harmonics of another OPD provides for both temperature and pressure measurement with a single interrogator and without complex spectral analysis.

16 Claims, 15 Drawing Sheets

(56) References Cited

U.S. PATENT DOCUMENTS

| | | | |
|---|---|---|---|
| 2007/0013914 A1* | 1/2007 | May | G01L 9/0079 |
| | | | 356/480 |
| 2007/0223000 A1* | 9/2007 | Gahan | G01D 5/266 |
| | | | 356/454 |
| 2009/0296776 A1* | 12/2009 | Riza | G01J 5/0014 |
| | | | 374/130 |
| 2010/0092125 A1* | 4/2010 | Kilic | G01H 9/004 |
| | | | 385/11 |
| 2010/0245840 A1* | 9/2010 | Vernooy | G01L 9/0079 |
| | | | 356/519 |
| 2011/0292965 A1* | 12/2011 | Mihailov | G01D 3/0365 |
| | | | 374/121 |

* cited by examiner

Fig. 1
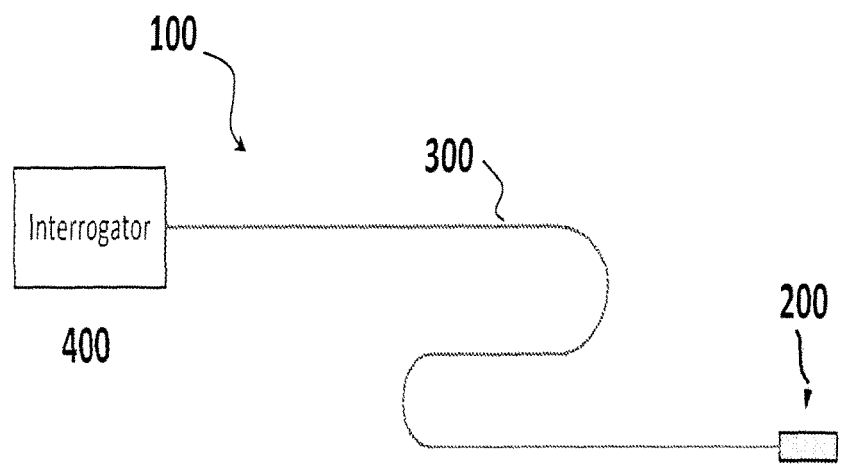
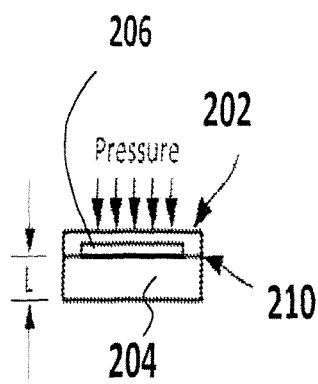
Fig 2A
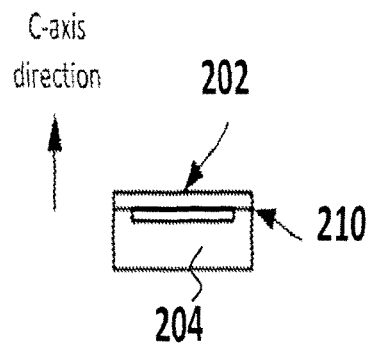
Fig. 2B
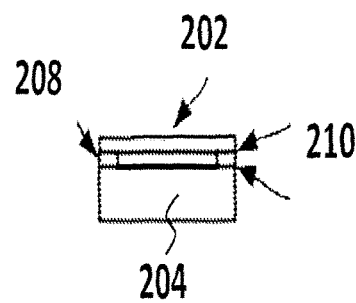
Fig. 2C

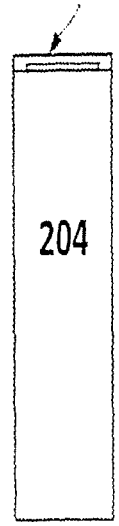 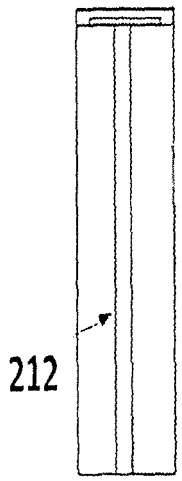 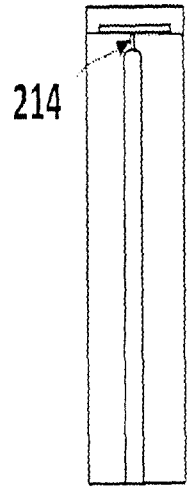 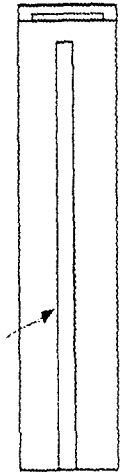
Fig. 3A  Fig. 3B  Fig. 3C  Fig. 3D
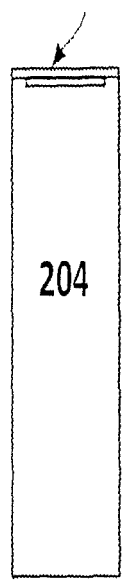 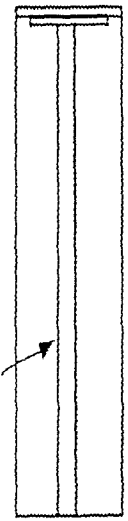 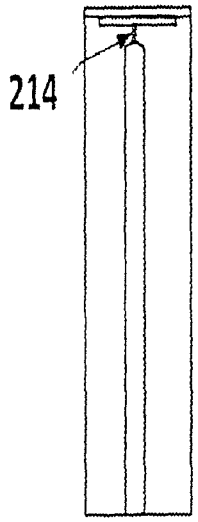 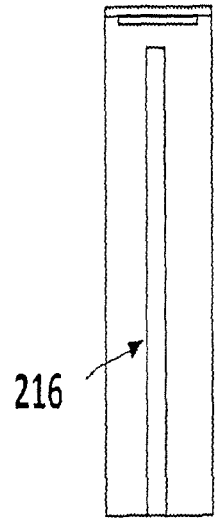 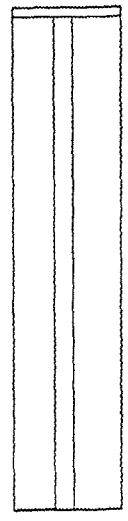
Fig. 4A  Fig. 4B  Fig. 4C  Fig. 4D  Fig. 4E

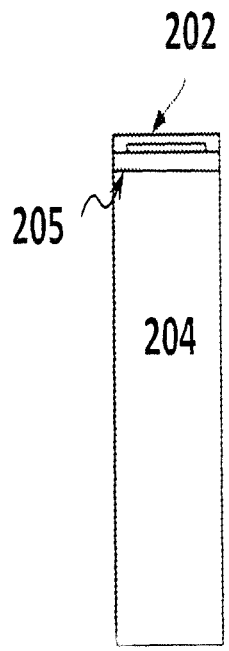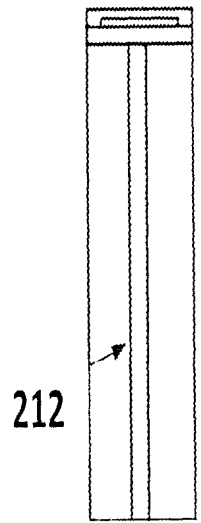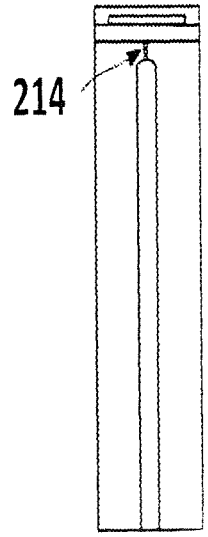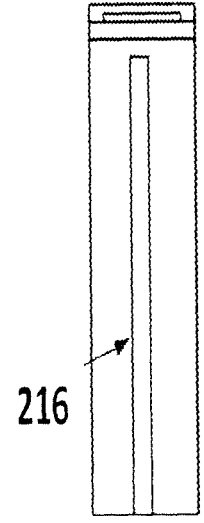
Fig. 5A    Fig. 5B    Fig. 5C    Fig. 5D
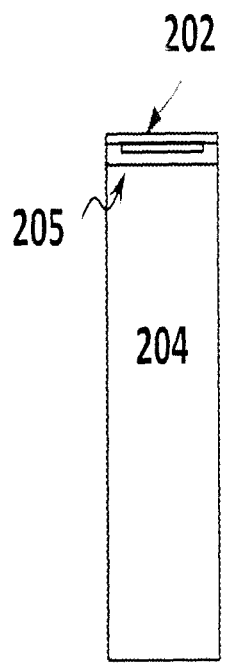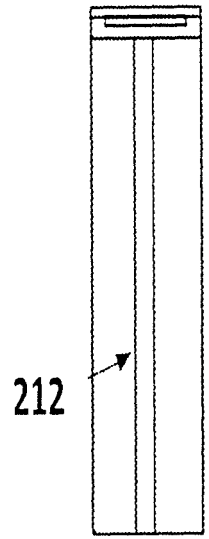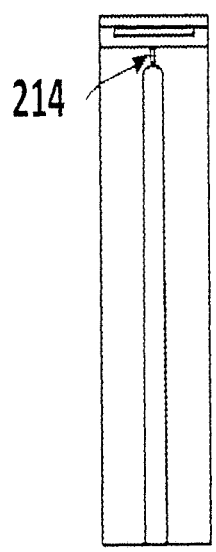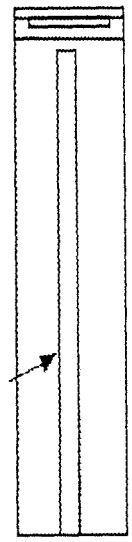
Fig. 6A    Fig. 6B    Fig. 6C    Fig. 6D

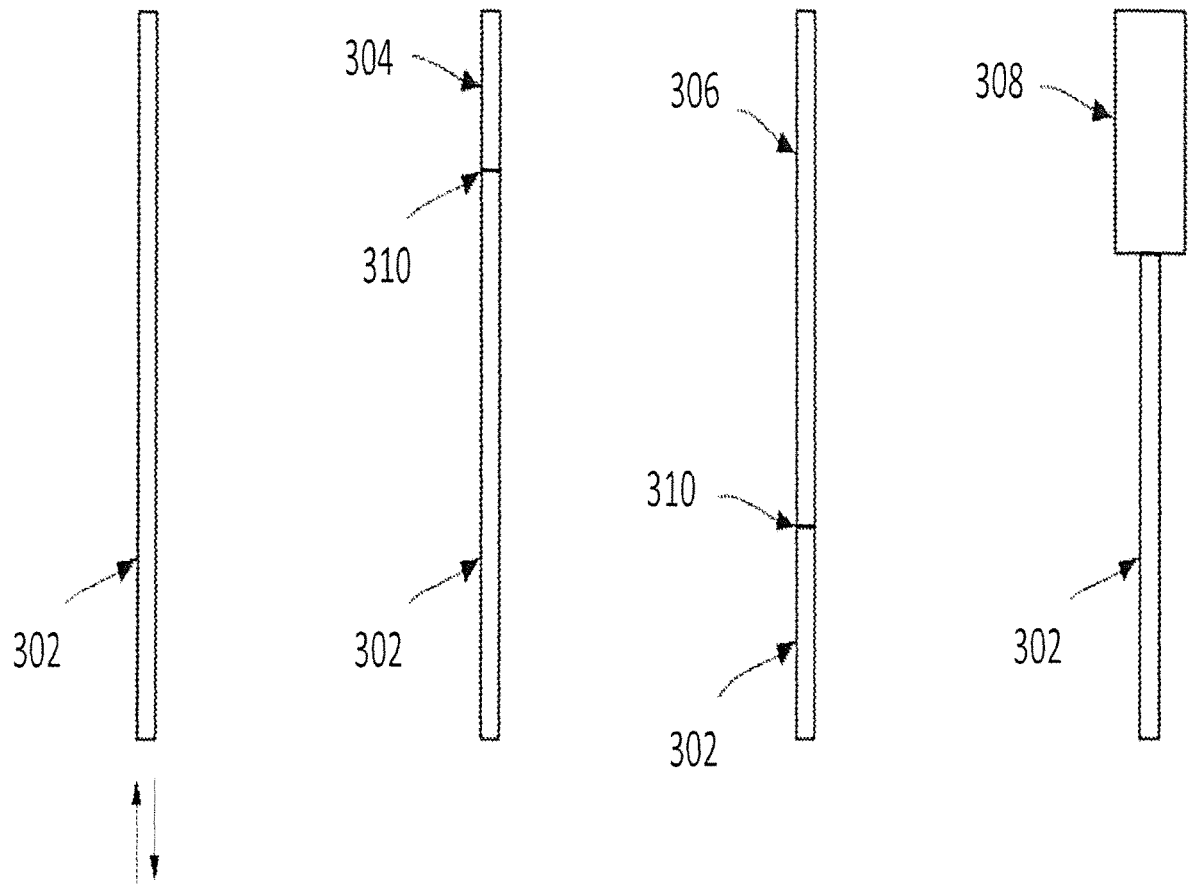

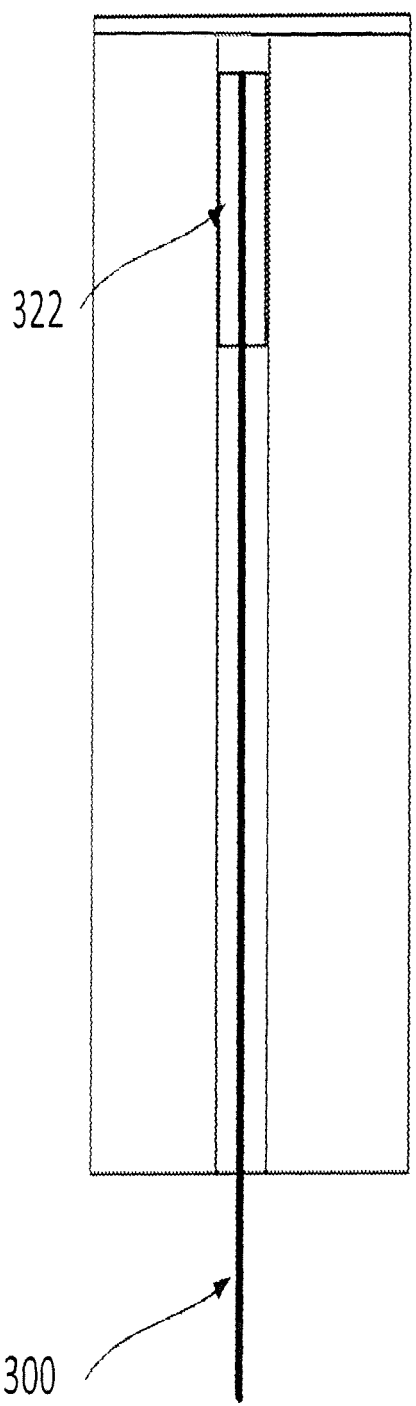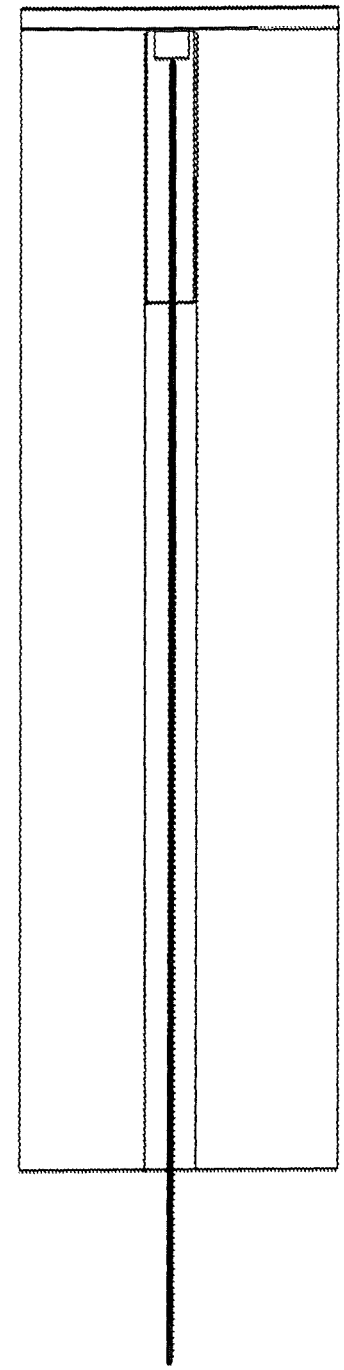
Fig. 12A
Fig. 12B

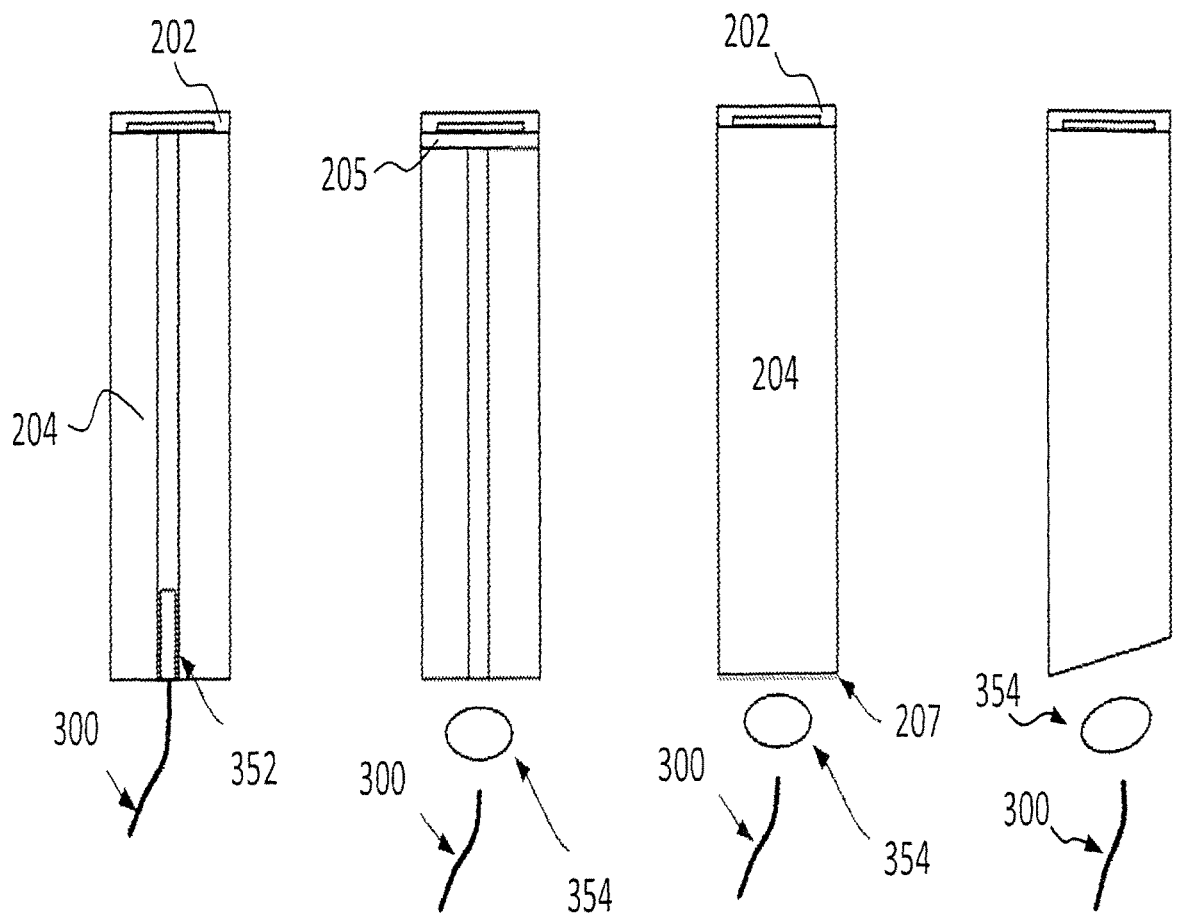

SAPPHIRE SENSOR APPARATUS INCLUDING AN OPTICAL FIBER FOR MEASURING PRESSURE AND TEMPERATURE

PRIORITY CLAIM

This application claims priority to U.S. Provisional Patent Application No. 61/816,146 filed on Apr. 25, 2013 and entitled DIRECT-BOND ENABLED SINGLE CRYSTAL SAPPHIRE SENSORS FOR MEASUREMENT OF PRESSURE AND TEMPERATURE, the entire contents of which are hereby incorporated by reference.

BACKGROUND

Pressure and temperature measurements are two of the most common parameters that need to be measured in nearly every industrial sector. Most of the current pressure sensors and measurement devices are based on the use of semiconductors, such as silicon. However, some pressure measurement needs are difficult to be fulfilled by the existing pressure sensor technologies due to various measurement environment challenges, such as high temperatures, electromagnetic interference (EMI) and remote signal transmission as required in oil/gas downhole measurement.

Single-crystal sapphire has a melting point of 2045° C. and is known to exhibit excellent resistance to chemical corrosion. In addition, it is transparent to a broad range of optical spectrum from ultra-violate (UV) to infrared (IR) and is relatively low cost. Besides the capability of high temperature operation and resistance against chemical corrosion, single-crystal sapphire is also known to offer excellent stability in other harsh environments. For example, many amorphous materials, such as glasses, show creep under high pressure especially at elevated temperatures. Further other foreign chemical species, such as gases and water can gradually diffuse into these materials under high pressure. The diffusion rate will pick up as temperature increases. The sensors built with amorphous materials will therefore exhibit drifts under these operating conditions. In contrast, single-crystal sapphire may exhibit minimal material creep and foreign material diffusion even under high pressure and elevated temperature. Therefore, single-crystal sapphire is an attractive material for construction of sensors for excellent long-term stability under high temperatures or high pressure or both even with presence of other diffusive species, such as various gases and water.

To build a pressure sensor, a hermetically sealed hollow cavity that can change in response to an externally applied pressure may be provided. Construction of such a hollow cavity may include bonding between different mechanical parts. For a sapphire pressure sensor, sapphire-to-sapphire direct bonding may provide benefits. The resulting sensor may offer high long-term stability. Additionally, the sensor may also have ultra-high temperature operation capability.

Two major sapphire-to-sapphire direct bond methods are known. One method was reported by A. Sugiyama, et al. [A. Sugiyama et al., "Direct bonding of Ti:sapphire laser crystals," Appl. Opt., vol. 37, p 2407, 1998]. This method consists of two steps. The first is to pre-bond two sapphire elements at a temperature around 200° C. The second step is to bake the pre-bonded sapphire assembly at a temperature above 1000° C.

The other method is plasma assisted bonding, described in U.S. Patent Application Publication No. 2012/0024073. Plasma assisted bonding may substantially reduce the baking or anneal temperature. Using a method similar to the one reported by Sugiyama et al., Virginia Tech researchers lately constructed a hermetically sealed sapphire Fabry-Perot (FP) cavity and demonstrated pressure measurement at room temperature [J. Yi, et al., "Demonstration of an all-sapphire Fabry-Perot cavity for pressure sensing," IEEE Photon. Tech. Lett., vol 23, p 9, 2011]. In this work, two a-cut sapphire wafers were used. One was etched to form an approximately 6 μm circular pit using a reactive ion etching (RIE) process. This etched wafer was then bonded to another wafer based on sapphire to sapphire direct bond. The FP cavity was then glued to a ceramic tube. A multimode fiber was inserted into the ceramic tube to the FP cavity for the sensor interrogation. The FP cavity was demodulated using whitelight interferometry. Because of the shallow FP cavity, a very broadband spectrum halogen lamp was used as the source along with an Ocean Optics spectrometer. In their test, the whole sensor including the FP cavity and the ceramic tube were placed in a pressure chamber and the fiber ran through a fiber feedthrough.

This sensor structure is not ideal for real applications. A practical pressure sensor usually has a metal casing with mechanical threads for convenient pressure-sealed sensor installation to a pressure vessel. Further, due to the significant mismatch in the coefficients of thermal expansion (CTEs) between the sapphire FP cavity and the ceramic tube, this sensor structure may not survive at high temperatures. Also, the thermal stresses induced by the CTE mismatch will introduce significant thermal dependence of the FP cavity distance and this dependence may not be repeatable due to the gradual release of the stresses trapped in the adhesive during its cure.

SUMMARY

In one embodiment, a sensor apparatus for measuring pressure, temperature or both may be provided. The sensor may include a diaphragm that may respond to a change in temperature or pressure, a base connected to the diaphragm, a cavity defined by the diaphragm and the base, and an optical fiber that may conduct light reflected off of a surface of the diaphragm. The diaphragm and base may be sapphire elements.

In another embodiment, a system for measuring pressure, temperature or both may be provided. The system may include a diaphragm that may respond to a change in temperature or pressure, a base connected to the diaphragm, a cavity defined by the diaphragm and the base, and an optical fiber that may conduct light reflected off of a surface of the diaphragm. The diaphragm and base may be sapphire elements. An interrogator may be provided for detecting a deflection of the diaphragm.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 1 shows an exemplary general system diagram for a pressure and temperature sensor system 100.

FIGS. 2A, 2B and 2C show exemplary hermetically sealed single-crystal sapphire FP cavities.

FIGS. 3A, 3B, 3C and 3D show exemplary long sapphire bases wherein the FP cavity forming well 206 may be machined or otherwise formed in the diaphragm.

FIGS. 4A, 4B, 4C, 4D and 4E show exemplary long single-crystal sapphire bases wherein a FP cavity forming well is machined or otherwise formed in the base.

FIGS. 5A, 5B, 5C and 5D show exemplary sensor embodiments wherein a FP cavity forming well 206 may be machined or otherwise formed in the diaphragm and a thin base may be bonded on a long base.

FIGS. 6A, 6B, 6C and 6D show exemplary sensor embodiments wherein a thin base 205 may be bonded to a long base, and the hollow FP cavity forming well may be machined or otherwise formed in the base.

FIGS. 7A, 7B, 7C and 7D show exemplary embodiments for fiber assemblies for FP cavity interrogation.

FIGS. 12A and 12B show exemplary embodiments of the hollow FP cavity defined between the diaphragm and the fiber end.

FIGS. 13A, 13B, 13C, and 13D show exemplary embodiments of standoff interrogation schemes wherein the interrogation fiber 302 may be distanced from the FP cavity.

DETAILED DESCRIPTION

Figures 8A, 8B, 8C, 8D:
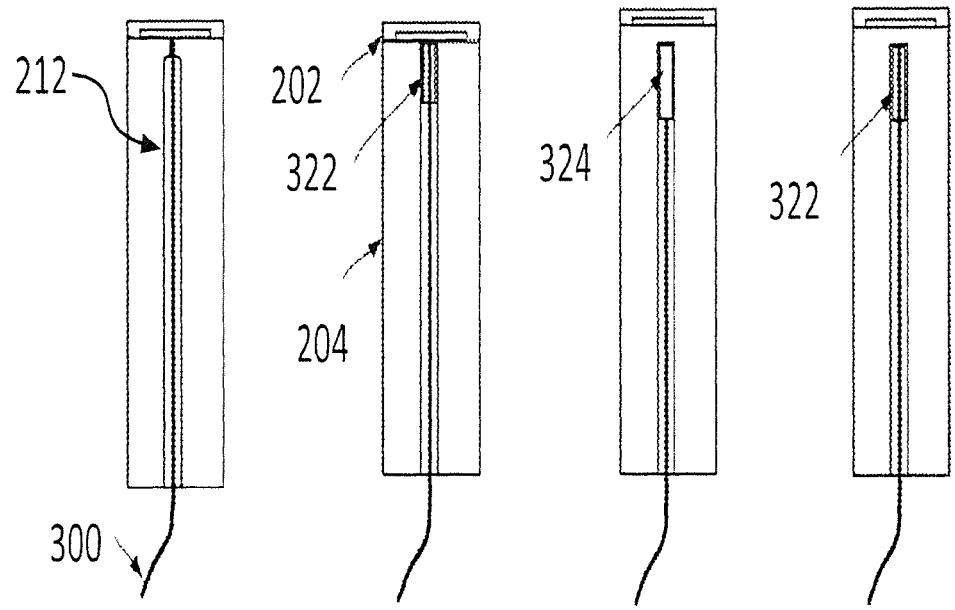
FIGS. 8A, 8B, 8C and 8D show exemplary interrogation schemes for close-up interrogation, wherein a well is machined or otherwise formed in the diaphragm.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific optical components, devices, and circuits (e.g. application specific integrated circuits (ASICs)) and/or by program instructions executed by at least one processor. Furthermore, the sequence of actions described herein can be embodied in a combination of hardware and software. Thus, the various aspects of the present invention may be embodied in a number of different forms, all of which have been contemplated to be within the scope of the claimed subject matter.

In an exemplary embodiment, a pressure sensor may be fabricated such that a pressure sensitive hollow cavity on a mechanical support that is made of the same material as that of the cavity. The construction may be such that there is no direct physical contact between the sensor metal casing or sensor housing and the proximity of the hollow cavity. The pressure sensitive cavity may be fabricated on a relatively long base. In another embodiment, a relatively shorter or smaller base may be provided. In this case, the pressure sensor may be mounted on another relatively long mechanical support that may be made of the same material.

FIG. 1 shows an exemplary general system diagram for a pressure and temperature sensor system 100. A single-crystal sapphire Fabry-Perot (FP) interferometric sensor system may be provided that permits simultaneous accurate measurement of pressure and temperature. The sensor system may include a sapphire sensor probe 200 and an optoelectronic sensor interrogator 400, which may be connected by an optical fiber cable 300. An exemplary operation of the interrogator 400 will be described in detail later.

A sensor probe may contain a pressure sensitive hermetically sealed hollow FP cavity. A hermetic seal may be realized by direct bonding of two, three or four single-crystal sapphire elements. Greater numbers of single-crystal sapphire elements may be combined as will be understood by those skilled in the art. One of the elements may be a diaphragm that can deflect under an externally applied pressure. The sapphire elements that form and surround the cavity may be directly bonded to one another such that the elements may collectively form a homogenous sapphire structure. The elements may form a substantially monolithic sapphire structure. The elements may be bonded via direct or fusion bonding without the use of any foreign materials which may have different coefficients of thermal expansion. Thus, the structure surrounding the cavity may consist essentially of sapphire.

FIGS. 2A-2C show exemplary hermetically sealed single-crystal sapphire FP cavities. In each of the exemplary structures, all the sapphire elements used may have the same crystal orientations. For example, their C-axes may all be along the normal line of the diaphragm as shown in FIGS. 2A-2C.

FIG. 2A shows an exemplary sapphire diaphragm 202 that may have a well 206 and may be bonded to a base 204. The well 206 in the diaphragm 202 may be mechanically machined, or may be formed by other methods such as reactive ion etching (RIE), focused ion beam (FIB), other chemical etching methods, or the like. The well 206 may be formed with at least its center region being a reasonably optical grade so an incident light can be partially reflected to a direction as defined by Snell's law. [G. Keiser, "Optical fiber communications," McGraw-Hill, Inc., 2nd Edition, New York, 1991]. The diaphragm 202 with an indented well 206 may be bonded to the base via direct sapphire-to-sapphire bonding surfaces 210, thereby forming a hermetically sealed hollow cavity. The diaphragm and the base may have a circular outer diameter. Alternatively, the outer diameter of the diaphragm and the base may conform to other geometrical shapes such as rectangular, elliptical, triangular, hexagonal, or the like. The hollow cavity may be filled with air, an inert gas or vacuum. When a pressure is externally applied, the diaphragm 202 may deflect, thereby changing the hollow FP cavity distance, which can be interrogated optically by various methods.

In the exemplary embodiment shown in FIG. 2B, a well 206 may be machined or otherwise formed in the sapphire base 204. The hollow FP cavity may also be formed by the use of a sapphire ring as a spacer 208 as shown in exemplary FIG. 2C. All physical contact surfaces 210 between the sapphire elements in the respective embodiments may be bonded by the direct sapphire-to-sapphire bonding. In some exemplary embodiments, both the diaphragm and the base may have a well. The two wells may have the same or different diameters.

The length L of the sapphire base may be long, generally greater than the diaphragm outer diameter. The length of the base may be at least 2 times or 3 times the diaphragm outer diameter. Alternatively, other dimensions may be employed. As a result of the relatively long base 204, an influence on the cavity by stresses induced by a sensor mounting in sensor installation or ambient temperature varations may be negligible or substantially zero.

FIGS. 3A-3D show exemplary long sapphire bases 204 wherein the FP cavity forming well 206 may be machined or otherwise formed in the diaphragm 202. The base 204 may be a solid cylinder or a cylinder with a center hole 212. The hole may be through or partial. The hole diameter may also vary.

FIG. 3A shows an exemplary embodiment wherein the sensor probe 200 may have a solid base 204. An interrogation light may be a collimated beam and may be injected from the lower end of the base to the hollow FP cavity. The reflections from the FP cavity and from the top surface of the diaphragm may travel through the base back to the light collimator. The long base may also have a center hole 212 which may be a through or a partial hole 216. The hole diameter may be constant or may vary along the hole as explained in FIGS. 3B, 3C and 3D. In FIG. 3C the center hole 212 tapers to a small center hole 214 as it approaches the FP cavity. In FIG. 3D, a partial hole 214 is provided that does not directly connect with the FP cavity. The different exemplary configurations of the sapphire base may facilitate the mounting of an interrogation fiber or a fiber collimator.

FIGS. 4A-4E show exemplary long single-crystal sapphire bases wherein a FP cavity forming well is machined or otherwise formed in the base.

A relatively thin base 205 may be provided that is relatively thin compared to the outer diameter of the diaphragm. In this case, the thin base 205 may be bonded to another relatively long sapphire support 204 so the physical contact of the sapphire sensor probe with a sensor metal casing can be designed to be sufficiently distanced from the FP cavity. The support may be a solid cylinder, or may have a center through-hole 212 or partial hole 216 whose diameter may be constant or may vary along the hole as shown in FIGS. 5A-5D.

FIGS. 5A-5D show exemplary sensor embodiments wherein a FP cavity forming well 206 may be machined or otherwise formed in the diaphragm 202 and a thin base 205 may be bonded on a long base 204. In FIG. 5A, a solid long base 204 may be provided. In FIG. 5B, a base with a constant diameter through hole 212 may be provided. In FIG. 5C, a base with a small center hole 214 connected to a larger diameter hole 212 may be provided. This configuration may facilitate the mounting of an interrogation fiber 300. In FIG. 5D, a base with a partial center hole 216 may be provided.

FIGS. 6A-6D show exemplary sensor embodiments wherein a thin base 205 may be bonded to a long base 204, and the hollow FP cavity forming well 206 may be machined or otherwise formed in the base. In FIG. 6A, a solid long base 204 may be provided. In FIG. 6B, a base 204 with a constant diameter through hole 212 may be provided. In FIG. 6C, a base with a small center hole 214 connected to a larger diameter hole 212 may be provided. This configuration may facilitate the mounting of an interrogation fiber. In FIG. 6D, a base with a partial center hole 216 may be provided. In some exemplary embodiments, a well may be formed in both the diaphragm and the base. These wells may have the same or different depths and diameters.

The FP cavities may be optically interrogated using an optical fiber 300. By the separation between the FP cavity and the interrogating fiber 300, the interrogation systems may be generally divided into two classes, namely close up interrogation and standoff interrogation.

FIGS. 7A-7D show exemplary embodiments for fiber assemblies for FP cavity interrogation. In FIG. 7A, a single-mode or multimode fiber 302 may be directly used. In FIG. 7B, a short segment of graded index multimode fiber 304 may be used as a light collimator. A glass fiber 302 may be spliced or connected 310 to a graded index multimode fiber 304. In FIG. 7C, a segment of single-crystal sapphire fiber 306 spliced or connected 310 to a glass fiber 302 may be used. In FIG. 7D, a fiber collimator 308 may be used. The lens in collimator 308 may be, but is not limited to, a graded-index cylindrical lens. The lens may be any type, as would be understood by a person having ordinary skill in the art.

The sensor or FP cavity interrogation may be realized by the use of an optical fiber 302, which may be a singlemode or a multimode fiber. The fiber may be or may be not connected to another fiber. FIG. 7A shows just the fiber 302 itself. The fiber may be spliced to a short segment of graded index multimode fiber 304 as shown FIG. 7B. In some, but not all exemplary embodiments, the length of this graded index fiber may be (N+0.25) where N is an integer N=0, 1, 2, . . . , and P is the pitch defined by the index distribution of the graded index multimode fiber. When this condition is met, this graded index multimode fiber 304 is called quarter pitch fiber 304. A quarter pitch graded index multiple fiber may have a core diameter greater than that of the input or the interrogation fiber, and may function as a miniature collimation lens to reduce the divergence of the light launched to the FP sensor.

A graded index quarter pitch fiber 304 may be spliced via thermal fusion to an interrogation fiber 302. The interrogation fiber 302 may be made of glass. The interrogation fiber 302 may also be connected to a segment of a single-crystal sapphire fiber 306 as shown in FIG. 7C to lead the optical signal to and from the sensor FP cavities which may be exposed to high temperatures. Finally, a fiber collimator 308, such as a graded index lens, may be used to collimate the light out of the interrogation fiber. In this case, the collimated optical beam diameter may be greater than the one from the graded index multimode fiber collimator for a greater coupling efficiency of the light reflected from the FP cavities.

FIGS. 8A-8D show exemplary interrogation schemes wherein a well 206 is machined or otherwise formed in the diaphragm 202. In FIG. 8A, a fiber 300 may be directly inserted insertion into the hollow FP cavity. In FIG. 8B, a fiber/ferrule assembly 322 may be mounted in the through hole 212 of the sapphire base 204. In an exemplary embodiment, an optically transparent adhesive may or may not be applied between the fiber end and the partial hole bottom surface. In FIG. 8C, a fiber/ferrule assembly 322 may be placed in a partial hole 216 of the sapphire base 204. In FIG. 8D, a graded index lens 324 and/or a fiber/ferrule assembly 322 may be provided in the base partial hole.

By the spatial separation between the interrogation fiber or fiber/collimation lens assembly, and the FP cavities, the sensor interrogation methods may be divided into close-up and standoff interrogations. Using one of the four cases presented in FIGS. 7A-7D, FIGS. 8A-8D present exemplary methods for close-up FP interrogation of a sensor with the well machined in the diaphragm. In FIG. 8A, the single-crystal sapphire base 204 may have a center through hole 212. An optical fiber 300, which may be single-mode or multimode fiber 302 or may be a fiber 302 spliced to a segment graded index multimode fiber, such as a quarter pitch graded index multimode fiber 304 or a sapphire fiber 306, is directly inserted into the hollow FP cavity. The fiber 300 may end at the top surface of the sapphire base 204 or may slightly extend above the surface (into the hollow cavity) or slightly recess below the surface. The fiber may be mounted to the base by an adhesive or by a 'heat-shrink' method. In this method, the base hole may be machined or otherwise formed such that it is slightly smaller than the fiber outer diameter at a given temperature, such as room temperature. When the base 204 is heated, due to the thermal expansion of the hole of the base, the hole diameter may sufficiently increase to allow the interrogation fiber 300 to be inserted. When the base 204 is cooled down, the fiber 300 may be firmly held in position in the hole.

The fiber 300 may also be mounted in the base 204 by the use of a fiber ferrule 322 as shown in FIG. 8B. The fiber ferrule 322 may be a short cylinder with a center hole. The ferrule center hole may be slightly larger than the diameter of the fiber cladding. The fiber 300 may be mounted in the ferrule hole by various methods, which include but are not limited to the use of an adhesive, the 'heat-shrink' method or thermal fusion. The ferrule 322 may be made of glass, ceramic, metal, sapphire or any other solid material. The fiber/ferrule assembly 322 is then mounted in the base center hole by various methods, which may include but are not limited to the use of an adhesive, the 'heat-shrink' method or thermal fusion. The fiber/ferrule 322 top may end above, within, or below the base 204 top surface.

The base 204 may also have a partial center hole 316 as shown in FIGS. 8C and 8D. In FIG. 8C, a fiber collimator 324 with a cylindrical outer surface may be used to collimate the light out of the fiber. One example is a graded index cylindrical lens based fiber collimator 324. The collimated light may propagate to the hollow FP cavity and collect the reflections from the interfaces, such as sapphire-air interfaces, between the different materials. A fiber/ferrule assembly 322 may also be used as shown in FIG. 8D. The fiber collimator 324 or the fiber/ferrule assembly 322 may be mounted in the base center hole by various methods which may include but are not limited to the use of an adhesive, the 'heat-shrink' method or thermal fusion.

The fiber or the collimator end may have an anti-reflection (AR) coating or simply bare glass without any coating. An index-matching optical adhesive may also be used between the fiber collimator or the fiber/ferrule end and the bottom of the base partial hole. The optical adhesive may be defined to be transparent to the wavelength of the light used in the sensor interrogation. The index of refraction of the adhesive may match that of the fiber or the sapphire. The index of the adhesive may also be between the indices of the fiber and the sapphire. For a given index of the adhesive, by controlling the geometrical thickness of the adhesive on the front end of the fiber/ferrule assembly or the fiber collimator, the optical reflection from the adhesive layer can be increased or decreased to best support the sensor interrogation. The adhesive applied to the cylindrical surface of the fiber/ferrule assembly or the fiber collimator may be or may be not transparent adhesive for the wavelengths of the light used in the sensor interrogation.

Figures 9A, 9B, 9C, 9D:
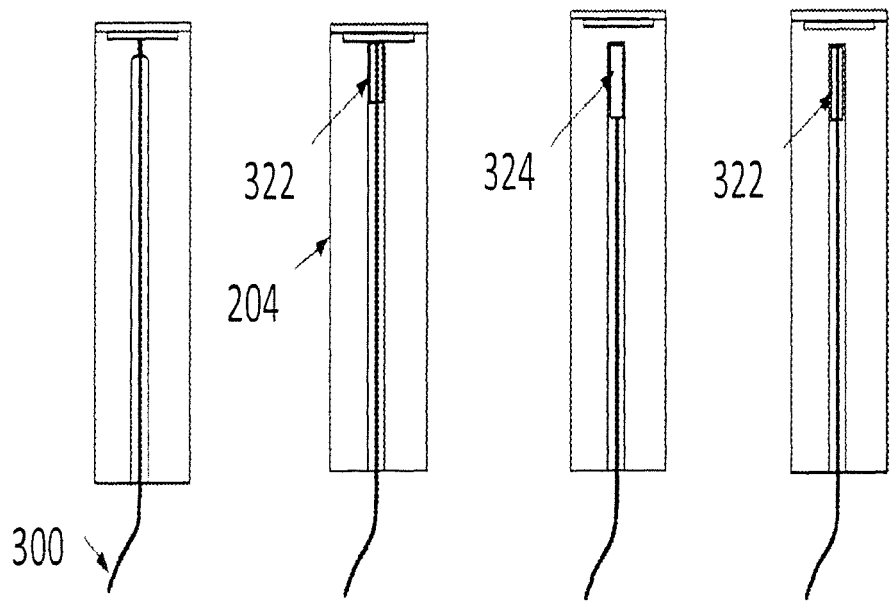
FIGS. 9A, 9B, 9C and 9D show exemplary embodiments for close-up interrogation schemes where the well may be machined or otherwise formed in the sapphire base.

FIGS. 9A-9D show exemplary embodiments for close-up interrogation schemes where the well 206 may be machined or otherwise formed in the sapphire base 204. In FIG. 9A, a fiber 300 may be directly inserted into the hollow FP cavity. In FIG. 9B, a fiber/ferrule assembly 322 may be mounted in the through hole 312 of the sapphire base 204. In FIG. 9C, a fiber/ferrule assembly 322 may be placed in the partial hole 316 of the sapphire base 204. In FIG. 9D, a graded index lens 324 may be provided in the base partial hole 316.

When the sapphire is thin (L is comparable to or smaller than the diaphragm outer diameter), the thin base 205 may be bonded to a relatively long sapphire support 204. As shown in FIGS. 5A-5D and 6A-6D, this sapphire support 204 may be a solid piece, wherein standoff interrogation may be used, or may have a through or partial center hole. The hole may also a varying diameter. Some of the close-up interrogation fiber arrangements as previously described can directly be applied.

Figure 10A:
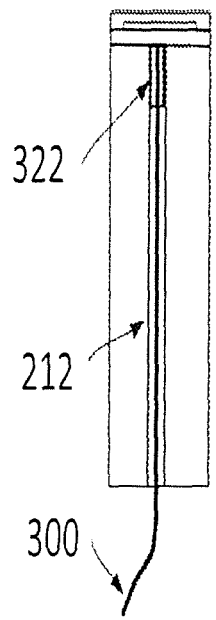
FIGS. 10A, 10B and 10C show exemplary close-up interrogation arrangements wherein a thin base may be bonded to a sapphire support long base and a well may be provided in the diaphragm.
Figure 10B:
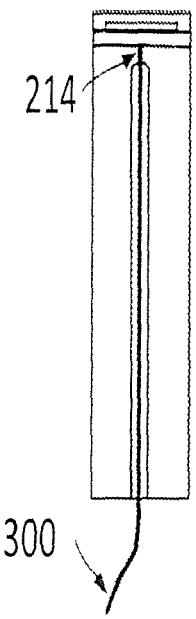
Figure 10C:
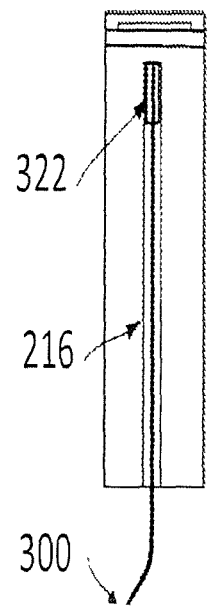

FIGS. 10A-10C show exemplary close-up interrogation arrangements wherein a thin base 205 may be bonded to a sapphire support long base 204, and a well 206 may be provided in the diaphragm 202. In FIG. 10A, a fiber/ferrule assembly 322 may directly contact the thin base 205. The fiber 300 may be just the interrogation fiber 302 directly or may have a graded index multimode fiber 304 spliced as a light collimator. In FIG. 10B, a fiber 300 may be directly inserted into the base. In FIG. 10C, a fiber/ferrule assembly 322 may be provided in the partial hole 316 of the sapphire support. In some embodiments, an optically transparent adhesive may be applied between the fiber end and the sapphire base.

Figure 11A:
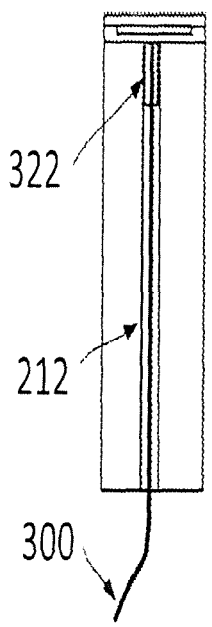
FIGS. 11A, 11B and 11C show exemplary close-up interrogation arrangements wherein a thin base may be bonded to a sapphire support long base, and a well may be provided in the thin base.
Figure 11B:
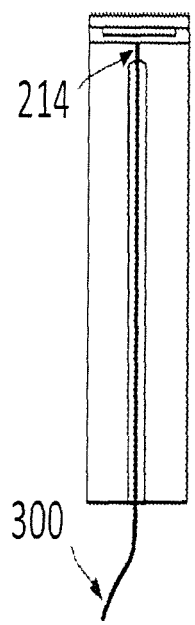
Figure 11C:
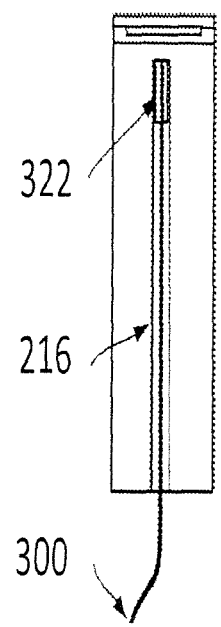

FIGS. 11A-11C show exemplary close-up interrogation arrangements wherein a thin base 205 may be bonded to a sapphire support long base 204, and a well 206 may be provided in the thin base 205. In FIG. 11A, a fiber/ferrule assembly 322 may directly contact the thin base 205. The fiber may be just the interrogation fiber 302 directly or may have a graded index multimode fiber 304 spliced as a light collimator. In FIG. 11B, a fiber 300 may be directly inserted to the thin base 305. In FIG. 11C, a fiber/ferrule assembly 322 may be provided the partial hole 316 of the sapphire support 304. In some exemplary embodiments, an optically transparent adhesive may be applied between the fiber end and the sapphire base. In alternative embodiments, an optically transparent adhesive may not be applied between the fiber end and the sapphire base.

Exemplary embodiments of the formation of the hollow FP cavity defined between the diaphragm and the end of the interrogation fiber may be shown in FIGS. 12A and 12B. In FIG. 12A, the fiber may be mounted in fiber ferrule 322. The ferrule may be firmly held in the center hole of the sapphire base by various methods, which may include but are not limited to adhesives, 'thermal shrink' or any other methods that can hold the ferrule firmly. The top surface of the ferrule may be separated from the diaphragm by a distance, which may be the hollow FP cavity distance. The cavity may be filled with air, an inert gas or vacuum. In FIG. 12B, the ferrule may have an indented well in the center at the top end. The edges of the well may or may not have a physical contact with the diaphragm. Also, the well may have different geometrical shapes. The fiber may extend above or recess below the center surface of the well in the ferrule.

For applications where the sensor may be placed in a high temperature environment, the interrogation fiber 302 may be connected to a segment of sapphire fiber 306 as shown in FIG. 7C. Another method to make the sensor capable of operation in temperatures above the limit of silica glass fiber, which is usually between 800° C. and 1000° C., is standoff interrogation. FIGS. 13A-13D show four exemplary embodiments of standoff interrogation schemes wherein the interrogation fiber 302 may be distanced from the FP cavity. In FIG. 13A, a fiber 300 may be coupled to a fiber collimator 324 which may engage a portion of a through hole. The fiber collimator 324 may engage a portion of the through hole spaced away from the FP cavity. In FIG. 13B-13D, a base 204 may be provided, and a lens 354 may be used to collimate light reflected through the base 204 such that the light passes through a fiber 300. As shown in FIG. 13C, an anti-reflective (AR) coating 207 may be disposed on base 204. In FIG. 13D, the lower end of the sapphire base may be angled such that the reflection from this angled surface does not enter in the interrogation fiber. In the meantime, the surface angle is designed so that the collimated light from the interrogation fiber is refracted at normal incidence to the FP cavities.

Figure 14:
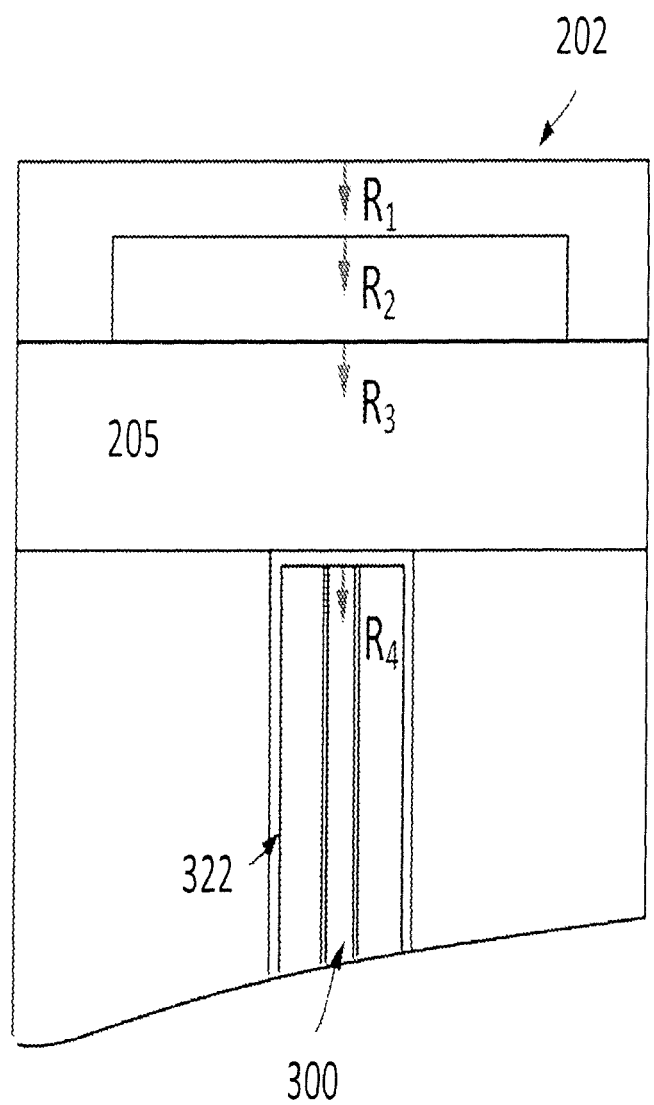
FIG. 14 shows an exemplary illustration of optical reflections from different material interfaces in the sensor.

For the different close-up and standoff interrogation schemes as previously described, multiple reflections from the interfaces between different elements may be generated. FIG. 14 shows an exemplary illustration of optical reflections from different material interfaces in the sensor. The example in FIG. 14 may correspond to the structure of the embodiment shown in FIG. 10a. The light out of the fiber or the graded index quarter pitch multimode fiber generates four reflections, namely $R_1$, $R_2$, $R_3$, and $R_4$ at the interfaces as shown in FIG. 14. Here $R_4$ may actually contain two reflections generated at the fiber/adhesive and adhesive/sapphire interfaces. However, when the adhesive thickness is sufficiently small, these two reflections can be grouped in one, namely $R_4$. Also, as previously mentioned, this reflection can be increased or decreased by the application and control of the index matching adhesive. Generally the optical path distances (OPDs) between $R_1$ and $R_2$, between $R_2$ and $R_3$, and between $R_3$ and $R_4$ are designed to be sufficiently different from one another. The OPD of an FP cavity may be given by the product of the cavity geometric distance and the index of refraction of the material in the cavity. When whitelight interferometric signal processing is employed to demodulate these OPDs, these OPDs are designed such that no major harmonic of a Fourier transform frequency peak corresponding to an OPD coincides with any other frequency peaks corresponding to the other OPDs.

To realize simultaneous measurement of pressure and temperature, at least two OPDs including the one between $R_2$ and $R_3$ (the OPD of the hollow FP cavity) may be demodulated. Two exemplary methods by which to demodulate these OPDs will be discussed. The first is whitelight interferometry.

Whitelight interferometry (WLI) allows the demodulation of a fiber Fabry-Perot interferometer. A WLI system may use either a tunable laser as the source or uses a broadband source such as a light emitting diode (LED) along with an optical spectrometer. The optical spectrum returned from the FP cavity may be measured. This spectrum may be modulated by the FP cavity so fringes with peaks and valleys may be observed in the detected optical spectrum. The peaks and valleys may correspond to constructive and destructive optical interference between the reflections from the FP cavity. By detecting the phase changes of the fringes in response to the FP cavity variation, the cavity OPD can be determined. When more than two reflections are returned from a composite FP cavity structure, fast Fourier transform (FFT) may be performed first. In the FFT spectrum, multiple peaks may appear which correspond to the interference between any pair of two reflections. When the OPDs of the composite FP structure are sufficiently different, these peaks may appear at different frequencies without overlap. These peaks may then be separated by the use of digital or analog bandpass filters. The interference fringes for each pair of reflections can be reconstructed and demodulated to determine the OPD between the two reflections [C. Ma, et al., "Optimization of single-/Multi-/single-mode intrinsic Fabry-Perot fiber sensors," J. Lightwave Tech., 30, p 2281, 2012; C. Ma and A. Wang, "Signal processing of white-light interferometric low-finesse fiber-optic Fabry-Perot sensors," Appl. Opt., 52, p 127, 2013].

Figures 15A, 15B:
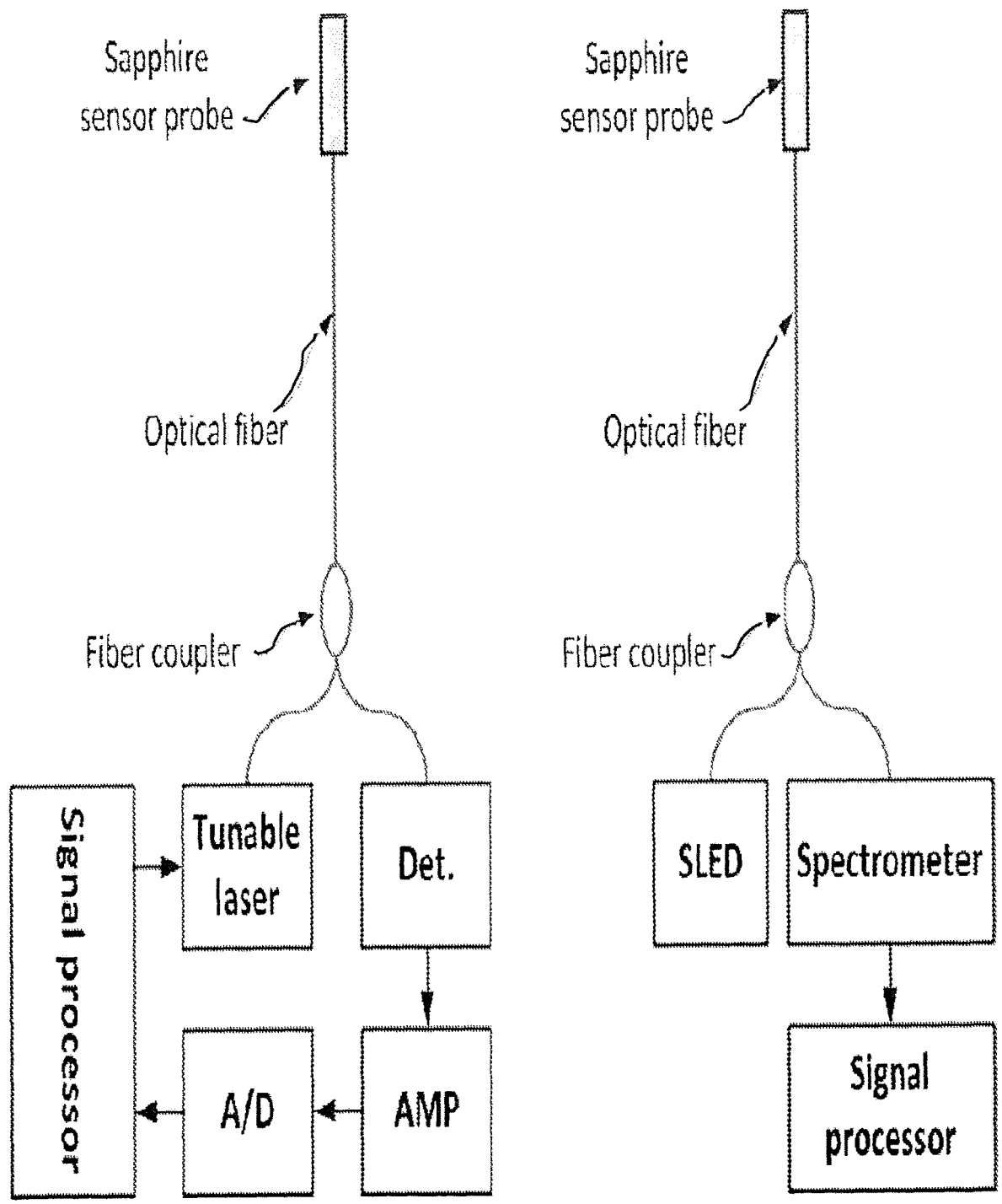
FIGS. 15A and 15B show exemplary whitelight interferometry systems.

FIGS. 15A and 15B show exemplary WLI systems that can use either a tunable laser or a broadband light source, such as a light emitting diode (LED), along with an optical spectrometer. Besides an LED, there are many other types of broadband optical sources that may also serve as the source in FIG. 15B. Some of these sources include but are not limited to superluminescent LEDs (SLEDs), amplified spontaneous emission (ASE) sources, and supercontinuum.

FIG. 15A shows an exemplary tunable laser based whitelight interferometric sensor system. FIG. 15B shows an exemplary broadband light source plus an optical spectrometer.

To mathematically explain how each of the sensor OPDs can be determined using the WLI, we assign these OPDs to be the OPDd between $R_1$ and $R_2$, the OPDp between $R_2$ and $R_3$, and the OPDb between $R_3$ and $R_4$. As discussed previously OPDp is primarily sensitive to pressure. Due to the thermal expansion of the diaphragm shoulders that define the FP cavity distance and the thermal dependence of the Young's modulus of the diaphragm material, the OPDp is also temperature dependent. In the meantime, OPDd and OPDb are primarily sensitive to temperature but still show some degree sensitivity to pressure. To the first order of approximation, these three OPDs may be expressed as $$OPD_p = A_p^1 \Delta p + A_T^1 \Delta T \quad (1)$$

$$OPD_d = A_p^2 \Delta p + A_T^2 \Delta T \quad (2)$$

$$OPD_b = A_p^3 \Delta p + A_T^3 \Delta T \quad (3)$$

where $A_p^i$ (i=1, 2 and 3) are the dependence coefficients of OPDp, OPDd, and OPDb on pressure, respectively, and $A_T^i$ are the dependence coefficients of OPDp, OPDd, and OPDb on temperature. Generally, we have $A_p^1 \gg A_p^2$ and $A_p^3$ and $A_T^2$ and $A_T^3 \gg A_T^1$. By solving Eqs. (1), (2) and (3), both pressure and temperature can be simultaneously determined. Here both OPDd and OPDb are mainly sensitive to temperature variations but insensitive to pressure. For some applications where the sensor probe is immersed into a medium, such as oil, whose index of refraction may be relatively close to that of sapphire, $R_1$ may be much weaker that $R_3$ and $R_4$, the temperature measured from OPDb may be more accurate.

When an optical spectrometer is used to measure optical spectrum from the sensor, the response time may be limited below several kilohertz. Although high speed tunable lasers are available, they are generally expensive. However, many applications require cost-effective high-speed dynamic pressure measurement. In the meantime, the response time for temperature measurement may not be a strong requirement. This is also partially because the thermal mass of the sensor tip may prevent the temperature of the sensor tip to vary rapidly. In these cases, different sensor interrogation techniques may be used.

Quadrature phase detection is a technique to measure relative changes of the OPD of an optical interferometer such as an FP cavity. The method may provide a low implementation cost and high speed signal demodulation. In addition, whitelight interferometry may require a minimum OPD for a given optical spectral range of detection. For example, for an LED at 1550 nm that has a spectral width of 50 nm, a minimum OPD may be more than 100 μm to warrant a high demodulation accuracy. In contrast, the quadrature phase detection does not have this contingent requirement.

The principle of quadrature phase detection is to inject two light beams at two different wavelengths $\lambda_1$ and $\lambda_2$. These two beams may also have a broadband spectrum. In this case the two wavelengths are effective center wavelengths of the two broadband spectra. For a given FP cavity, these two wavelengths are chosen such that their optical phases are different by $N\pi \pm \pi/2$ where N is an integer. Using a standard quadrature phase detection, any change in the OPD can be determined [P. L. M. Heydemann, "Determination and correction of quadrature fringe measurement errors in interferometers," Applied Optics, 20(19), 3382, 1981]. For the quadrature detection, it is preferred for the interrogation light to see interference fringes from only one FP cavity, which in the sapphire sensor case is the pressure sensitive hollow FP cavity. However, as described earlier, there are additional reflections from the sensor besides the two from the hollow FP cavity, such as $R_1$ and $R_4$ as shown in FIG. 14. To eliminate the optical interference from $R_1$ and $R_4$ with $R_2$ and $R_3$, the sensor is designed to have $$OPD_p < L_c < OPD_d \text{ and } OPD_b \quad (4)$$

where $L_c$ is the coherence length of the sources. The coherence length of a source with a Gaussian spectrum distribution is given by $L_c = \lambda_0^2/\Delta\lambda$ where $\lambda_0$ is the center wavelength and $\Delta\lambda$ is the spectral width [Principle of Optics by M. Born and E. Wolf, 7th Edition, Cambridge University Press, Cambridge, UK, 1999]. Here we assume the two sources have similar coherence lengths. When the condition in Eq. (4) is met, effective optical interference between $R_2$ and $R_3$ occurs but the other reflections namely $R_1$ and $R_4$ do not contribute to the generation of interference fringes.

Figure 16:
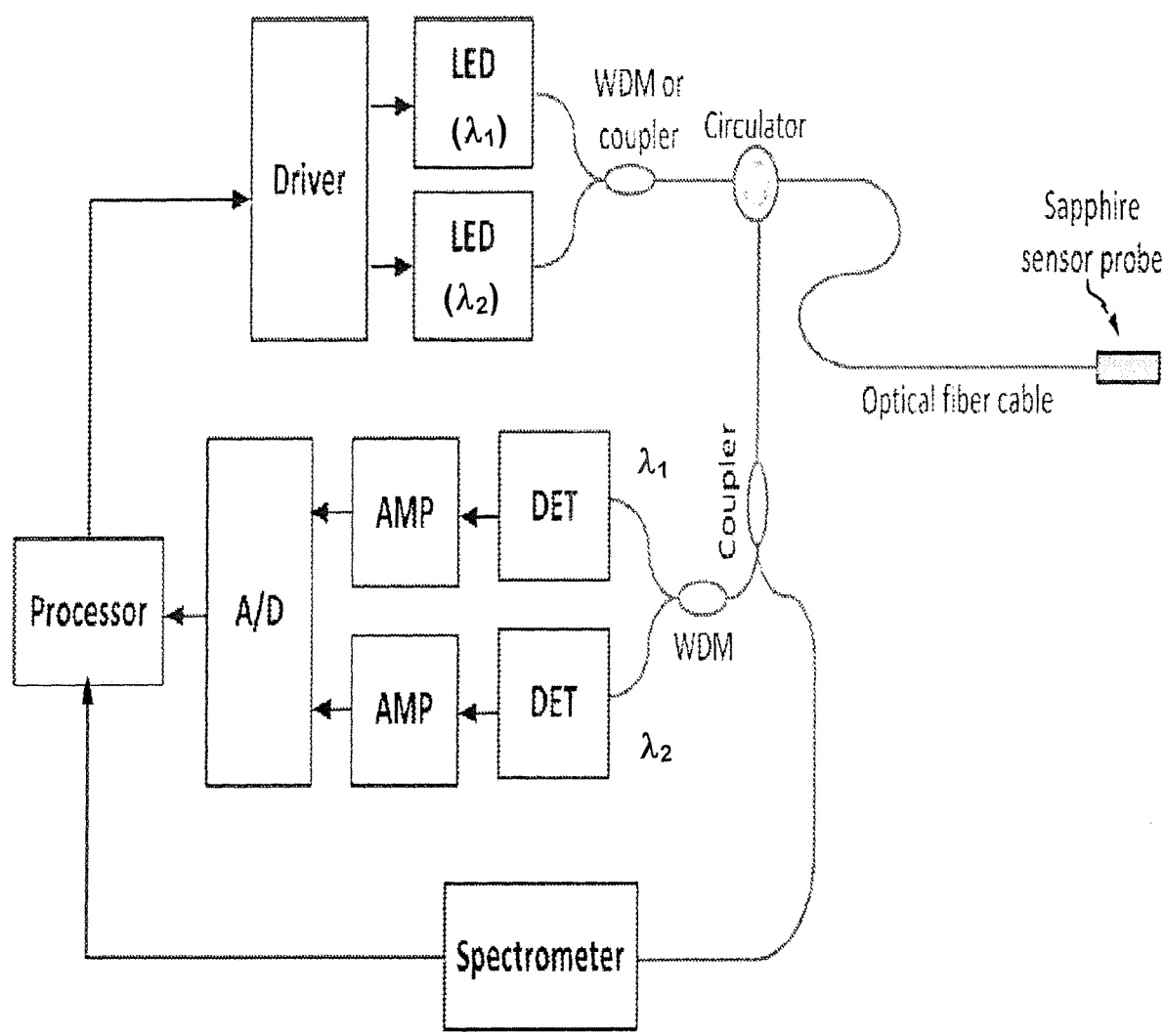
FIG. 16 shows an exemplary sensor system that may combine quadrature phase detection primarily for dynamic pressure measurement and whitelight interferometry mainly for temperature measurement.

FIG. 16 shows an exemplary sensor system that may combine quadrature phase detection primarily for dynamic pressure measurement and whitelight interferometry mainly for temperature measurement. Two broadband sources, such as LEDs, at $\lambda_1$ and $\lambda_2$ are used. The light from the sources may propagate to the sensor through a fiber cable. The light reflected from the sensor may be divided into two detection channels. One may measure the spectrum of either one of the two sources or both of the sources for whitelight signal processing. This channel may permit accurate determination of all OPDs of the sensor, including the most temperature sensitive OPDd and OPDb. The other channel may be further split into two paths by a wavelength division multiplexer (WDM). The WDM may or may not be a fiber-based device. As shown in FIG. 16, these two paths may detect the light at $\lambda_1$ and $\lambda_2$. The wavelength and optical spectral width of each of the two paths are chosen to satisfy the condition in Eq. (4) and the quadrature phase shift so the signals of the two paths can resolve any change in the OPD between $R_2$ and $R_3$.

Figure 17:
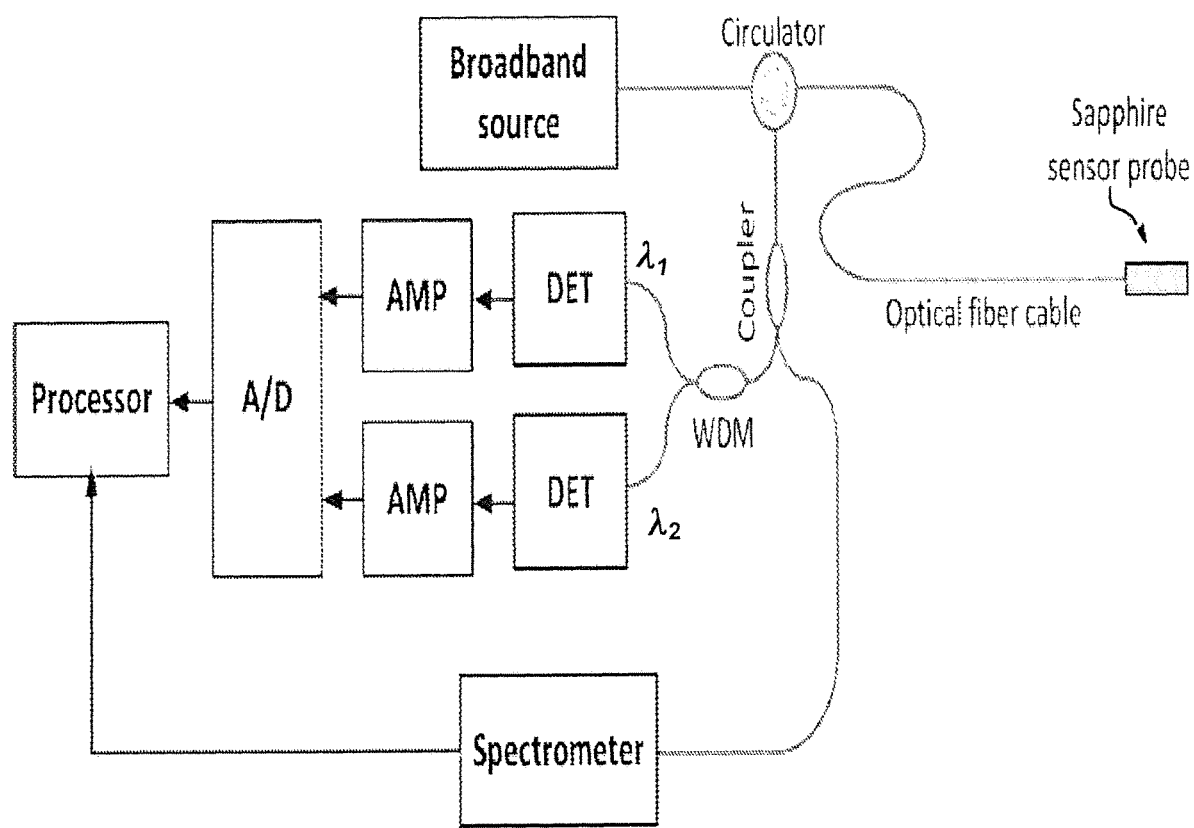
FIG. 17 shows another exemplary sensor system that may combine quadrature phase detection primarily for dynamic pressure measurement and whitelight interferometry mainly for temperature measurement.

The sources in the exemplary embodiment of FIG. 16 may be replaced by a single broadband source such as an LED as shown in FIG. 17. The broadband spectrum may be split into two parts by a WDM, which may in some embodiments be an optical edge filter, in the signal detection. The WDM may alternatively be any acceptable WDM as would be reasonably understood by a person having ordinary skill in the art. Each of the two slit spectrum parts may have an equivalent center wavelength and spectral width that simultaneously satisfy the quadrature phase condition and Eq. (4).

Figure 18:
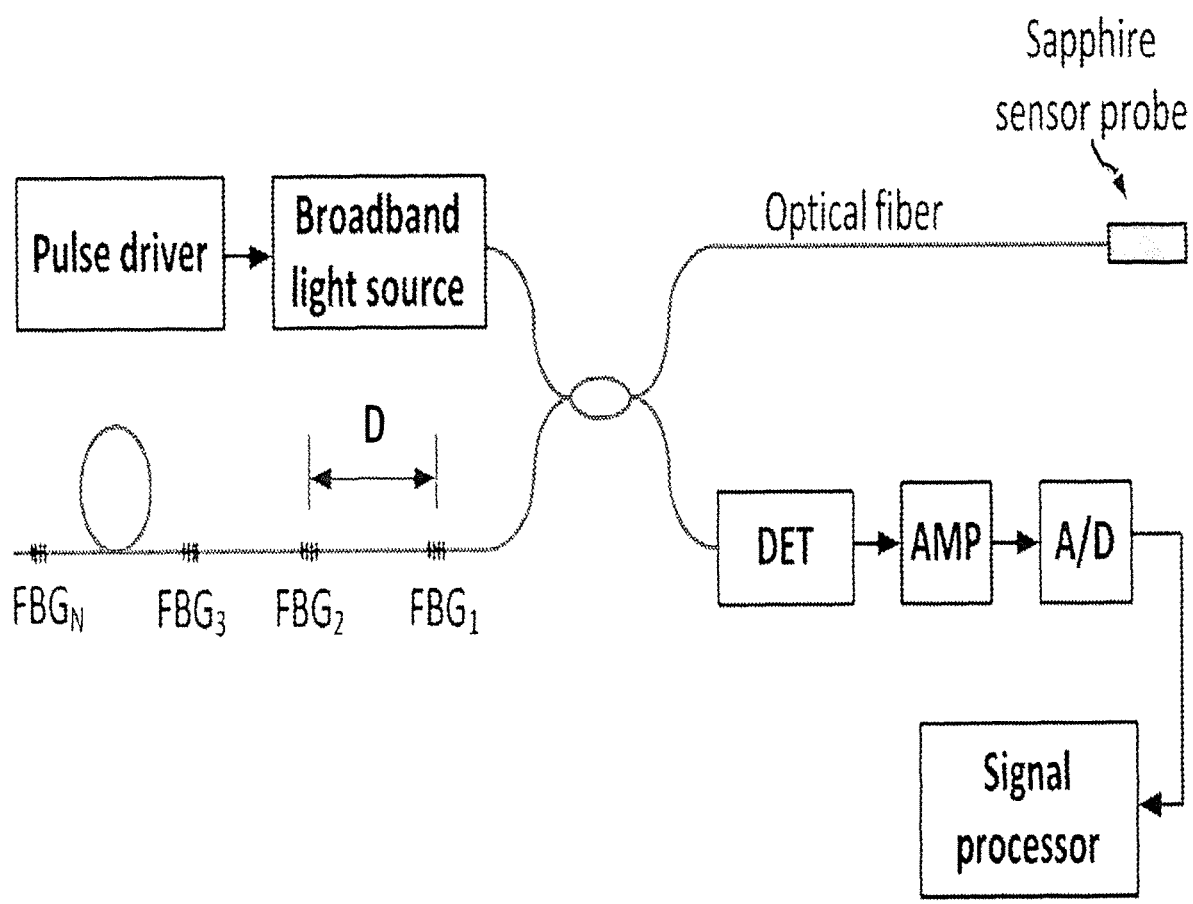
FIG. 18 shows another exemplary sensor system that may be used for high-speed, low cost sensor signal processing.
Figure 19:
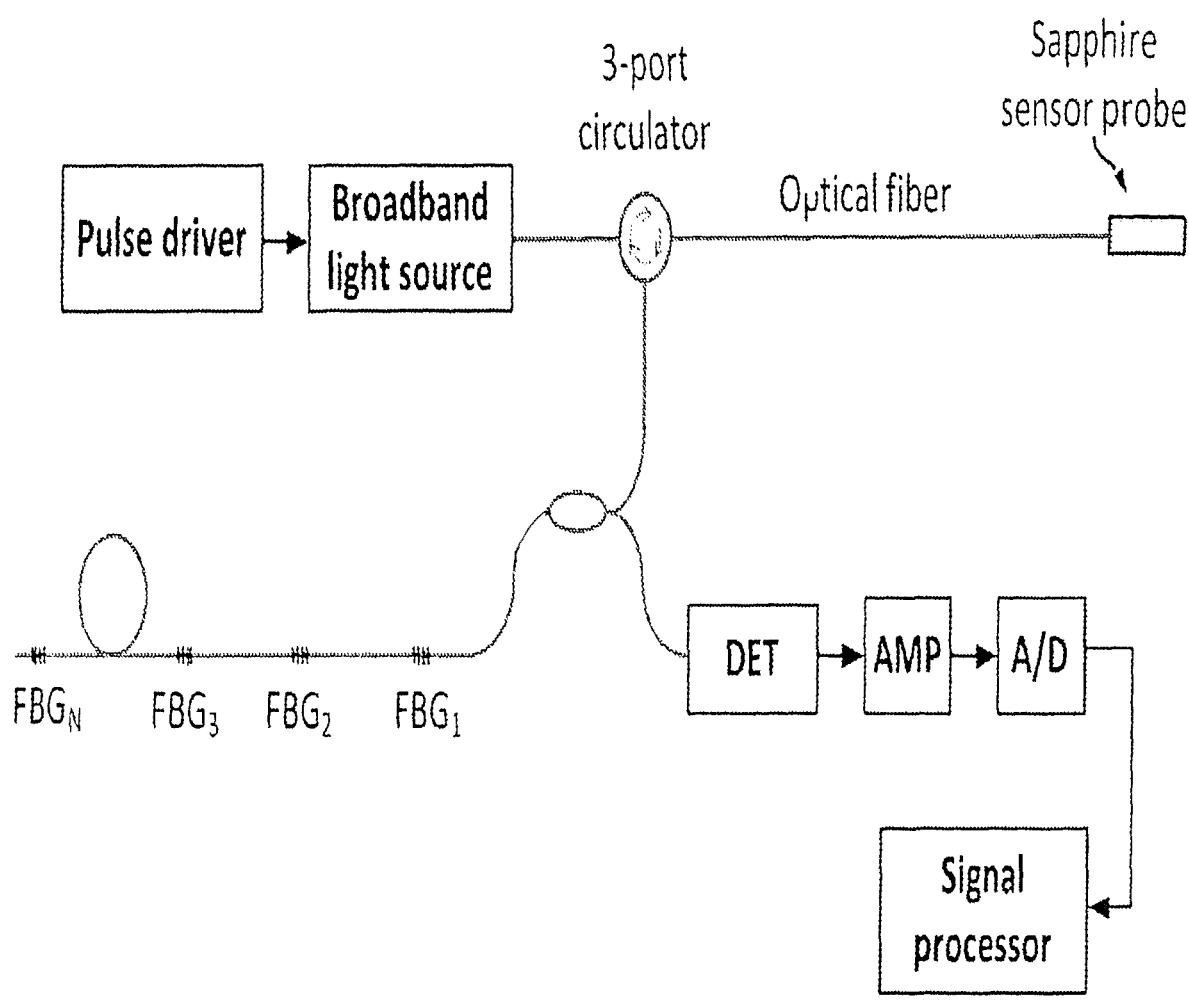
FIG. 19 shows another exemplary sensor system that may be used for high-speed, low cost sensor signal processing.
Figure 20:
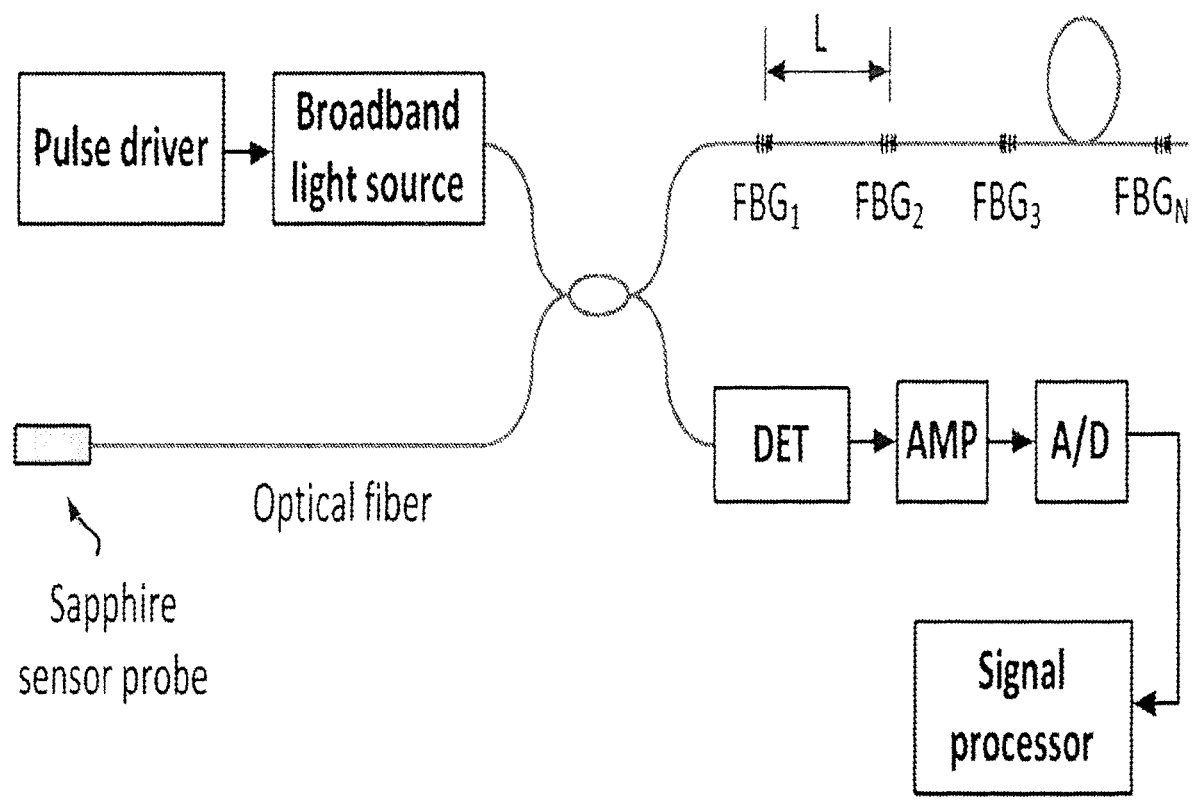
FIG. 20 shows another exemplary sensor system that may be used for high-speed, low cost sensor signal processing.

Quadrature detection may be useful for high-speed sensor signal processing. FIGS. 18-20 show an alternative exemplary technique that may be used for high-speed, low cost sensor signal processing. The technique may be used with quadrature detection and whitelight interferometric signal processing. The system may include a pulse driver and a broadband light source. An optical pulse may be launched into one of the two ports of the 2×2 fiber coupler. The broadband light source may include, but is not limited to an LED, a SLED, a semiconductor optical amplifier (SOA) switch or shutter, or any other broadband light source as may reasonably be understood by a person having ordinary skill in the art. The light pulse generated by the source may be split into two pulses. One pulse may propagate to the sapphire sensor probe. Reflections from the sensor probe may travel to serial fiber Bragg gratings (FBGs), which may have different reflection or Bragg wavelengths. The Bragg wavelengths may cover part of or the entire optical spectrum of the light source.

The spatial separation between two neighboring FBGs may be denoted as D. D may be constant or varying. In the present explanation, D may be assumed to be constant. The FBGs may be disposed in one fiber or in different fibers. If the FBGs are disposed in different fibers, another 1×N, N×N fiber coupler or any other type of optical beam splitter, as would be reasonably understood by a person having ordinary skill in the art, may be used to split the reflections from the sensor into N channels of fiber. The optical distances between the FBGs and the fiber coupler may be different from each other.

The optical signal reflected from the sensor may be reflected by the serial FBGs. Each FBG may reflect only a portion of the incident optical spectrum. The reflections from the serial FBGs may then be detected by a light detector (DET). The photoelectric signal may be amplified by an electronic amplifier (AMP) and digitized by an analog-to-digital converter (A/D) for further signal processing.

Since the reflections from the serial FBGs may be delayed by different amounts of time, successive light pulses may appear at the DET. The magnitude of each pulse from each of the FBGs may offer a sampling of the optical spectrum of the signal reflected from the sensor. The sensor OPDs may then be determined by the application of an interferometric signal processing technique. The interferometric signal processing technique may include, but is not limited to, quadrature detection, whitelight interferometry, or any other technique as would reasonably be understood by a person having ordinary skill in the art.

The temporal separation between neighboring pulses reflected from the serial FBGs may be designed to be relatively large by choosing a large D. As a result, the light source pulse width may be large and the requirement on the speed of the DET and AMP may be relaxed. Additionally, the requirement on the speed of the A/D may be reduced. This combination of features may allow high-speed sensor signal demodulation at a low cost.

FIG. 19 shows an alternative embodiment utilizing a 3-port optical circulator. FIG. 20 shows an alternative embodiment where the serial FBGs may be disposed before the light from the source reaches the sensor.

The sensing schemes shown in FIGS. 18-20 may be applicable to multiple sensors. The sensors may be connected to the source via different fiber delay lines and a fiber star coupler or fiber switch. The signals from the sensors may be separated at the photodetection by the arrival times.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A sensor apparatus for measuring a pressure, a temperature, or both, the sensor comprising:
    a diaphragm configured to respond to a change in temperature or pressure, the diaphragm comprising at least one sapphire element;
    a base comprising at least one sapphire element;
    a cavity between the diaphragm and the base defined by a at least one of a recess in at least one of said base and said diaphragm and a sapphire spacer having a closed geometric shape wherein boundary surfaces of said diaphragm, a boundary surface of said base and boundary surfaces of said cavity are partially reflecting surfaces and respective pairs of said partially reflecting surfaces define optical path distances (OPDs) that produce preferential reflections and interference patterns at different optical frequencies and wherein said OPDs are arranged such that a fundamental frequency and major harmonics of the interference pattern for any OPD do not coincide with any fundamental frequency or major harmonic of an interference pattern for any other OPD, whereby all OPDs can be independently measured by a single interrogator, and
    an optical fiber that is configured to conduct light reflected off boundary surfaces of said cavity and said base and diaphragm.

2. The sensor apparatus as recited in claim 1, wherein said base comprises a thin base bonded to a thicker or long base and wherein said partially reflecting surface at said boundary of said base is a boundary of said thin base.

3. The sensor apparatus of claim 1, wherein the at least two sapphire elements are connected via sapphire-to-sapphire direct bonds.

4. The sensor apparatus of claim 1, wherein the sapphire elements are directly bonded such that the cavity is defined by a homogenous sapphire structure.

5. The sensor apparatus of claim 1, wherein the diaphragm has a diameter or width extending across a surface of the diaphragm, and a length of the base is greater than a bonded diameter or width of the diaphragm.

6. The sensor apparatus of claim 1, wherein the optical fiber terminates at a distal end thereof, and the optical fiber distal end is coupled to the base and is disposed proximal to the cavity.

7. The sensor apparatus of claim 1, wherein a lens is disposed at a proximal surface of the base, the lens being configured to collimate light passing between the base and the optical fiber.

8. The sensor apparatus of claim 1, wherein a light collimator or a fiber portion configured to act as a light collimator is provided at or near the distal end of the optical fiber.

9. The sensor apparatus of claim 1, wherein the optical fiber comprises a length of graded index fiber.

10. The sensor apparatus of claim 1, wherein the optical fiber includes a segment of single crystal sapphire fiber and a length of glass fiber.

11. A system for measuring a pressure, a temperature, or both, the system comprising:
    a diaphragm configured to respond to a change in temperature or pressure, the diaphragm comprising at least one sapphire element;
    a base comprising at least one sapphire element;
    a cavity between the diaphragm and the base defined by at least one of a recess in at least one of said base and said diaphragm and a sapphire spacer having a closed geometric shape wherein boundary surfaces of said diaphragm, a boundary surface of said base and boundary surfaces of said cavity are partially reflecting surfaces and respective pairs of said partially reflecting surfaces define optical path distances (OPDs) that produce preferential reflections and interference patterns at different optical frequencies and wherein said OPDs are arranged such that a fundamental frequency and major harmonics of an interference pattern of any OPD do not coincide with any fundamental frequency or major harmonic of an interference pattern of any other OPD;
    an optical fiber that is configured to conduct light reflected off boundary surfaces of said cavity and said base or diaphragm; and
    an interrogator for independently detecting a deflection of said diaphragm and an OPD of the diaphragm or the base, respectively.

12. The system of claim 11, wherein said base comprises a thin base bonded to a thicker or long base and wherein said partially reflecting surface at said boundary of said base is a boundary of said thin base.

13. The system of claim 11, wherein the system is configured to demodulate one or more signals received by the interrogator to determine an OPD of at least one of the diaphragm, the cavity or the base.

14. The system of claim 11, wherein a whitelight interferometry unit is provided, the whitelight interferometry unit being configured to demodulate one or more signals received by the interrogator to determine an OPD of at least one of the diaphragm, the cavity and the base.

15. The system of claim 11, wherein the interrogator includes a tunable laser or a broadband light source and an optical spectrometer.

16. The system of claim 11, wherein said interrogator includes an optical coupler or optical circulator and a plurality of Fiber Bragg gratings having different center frequencies/wavelengths disposed along one or more optical fibers at different distances from said light source and said sensor.

* * * * *